US012611740B2

(12) United States Patent　　(10) Patent No.:　US 12,611,740 B2

Nestor, III et al.　　(45) Date of Patent:　Apr. 28, 2026

(54) METHODS FOR ATTACHING A WICK PLUG TO A WICK

(71) Applicant: Westinghouse Electric Company LLC, Cranberry Township, PA (US)

(72) Inventors: Christopher M. Nestor, III, Murrysville, PA (US); Tyler Imprescia, Cranberry Township, PA (US); John Lojek, III, Latrobe, PA (US); Michael A LaPresti, Greensburg, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/827,721

(22) Filed: Sep. 7, 2024

(65) Prior Publication Data

US 2026/0070166 A1　　Mar. 12, 2026

(51) Int. Cl.
B23P 15/26　　(2006.01)

(52) U.S. Cl.
CPC ........... B23P 15/26 (2013.01); B23P 2700/09 (2013.01)

(58) Field of Classification Search
CPC .. B23P 15/26; B23P 2700/09; F28D 15/0283; F28D 15/0241; F28D 2015/0225; F28D 21/00
See application file for complete search history.

(56) References Cited

U.S. PATENT DOCUMENTS 3,670,397 A * 6/1972 Lewis .................... B23K 20/00
228/262.71
3,971,634 A 7/1976 Ranken et al.

4,196,504 A 4/1980 Eastman
5,193,737 A * 3/1993 Carraher .............. B23K 20/002
228/44.3
10,643,756 B2 5/2020 McClure et al.
11,650,016 B2 5/2023 Swartz et al.
12,007,171 B1 * 6/2024 Reid .................... B23K 31/027
2003/0234278 A1 * 12/2003 Tominaga ........... B23K 20/023
219/136
2007/0280862 A1 * 12/2007 Davis .................... F16K 27/003
422/600
2023/0070156 A1 3/2023 Gross

FOREIGN PATENT DOCUMENTS

AU　　2021224784 A1　　9/2022

OTHER PUBLICATIONS

International Search Report and Written Opinion in corresponding International Application No. PCT/US2025/036621, mailed Oct. 8, 2025.

* cited by examiner

*Primary Examiner* — Lee A Holly

(74) *Attorney, Agent, or Firm* — K&L Gates LLP

(57)　　　　　ABSTRACT

A method of attaching a wick plug to an annular wick with the annular wick defining an outside diameter. The method includes positioning the wick plug at least partially within the annular wick; placing a clamp over the outside diameter of the annular wick; and heating the clamp, the annular wick, and the wick plug to a temperature sufficient to thermally expand the wick plug and the annular wick to exert a compressive force onto the wick plug and the annular wick by the clamp to compress the wick plug and the annular wick together.

16 Claims, 9 Drawing Sheets

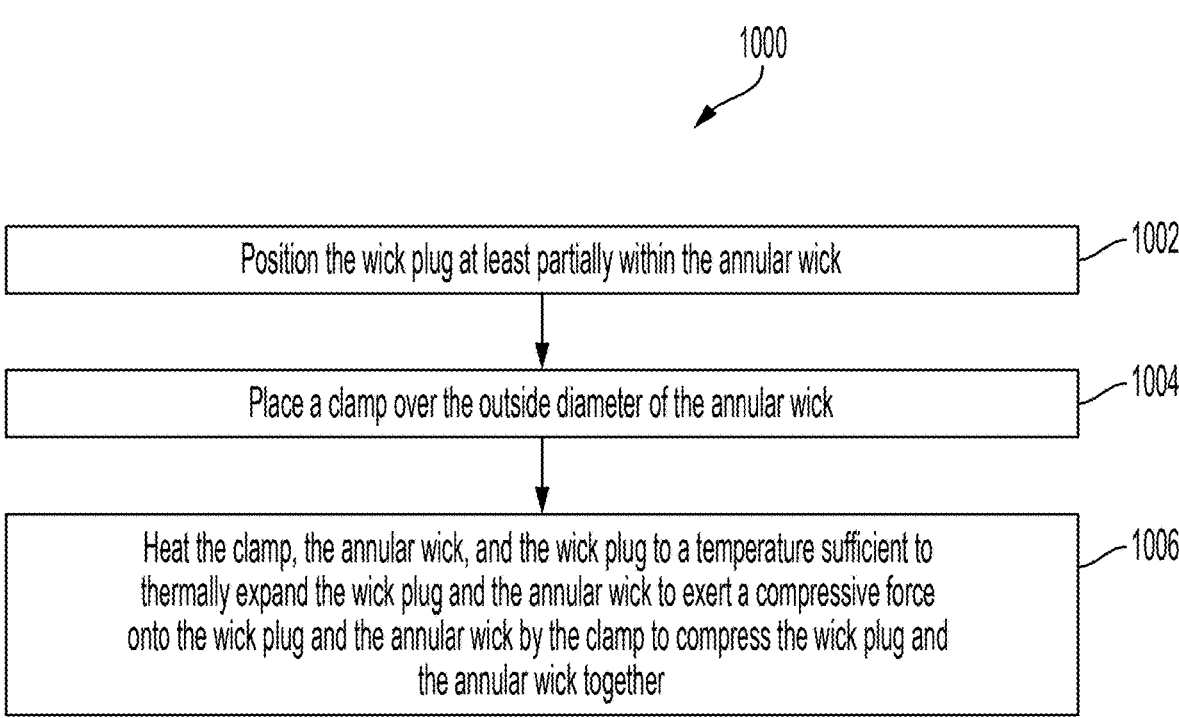

1000

1002 — Position the wick plug at least partially within the annular wick

1004 — Place a clamp over the outside diameter of the annular wick

1006 — Heat the clamp, the annular wick, and the wick plug to a temperature sufficient to thermally expand the wick plug and the annular wick to exert a compressive force onto the wick plug and the annular wick by the clamp to compress the wick plug and the annular wick together

FIG. 16

METHODS FOR ATTACHING A WICK PLUG TO A WICK

GOVERNMENT CONTRACT

This invention was made with government support under MEITNER Award No. DE-AR0000979/DOE 2271. The government has certain rights in the invention.

FIELD

The present disclosure is generally related to wicks for use with heat pipes to facilitate heat removal and, more particularly, is directed toward attaching wick plugs to annular wicks.

BACKGROUND

This invention relates generally to heat pipes used in heat transfer systems, and more particularly, toward devices and methods for attaching wick plugs to wicks for use within heat pipes.

A heat pipe is a hermetically sealed, two-phase heat transfer component used to transfer heat from a primary side (e.g., an evaporator section) to a secondary side (e.g., a condenser section). FIG. 1, as an example, illustrates a heat pipe 100 comprising the aforementioned evaporator section 102 and condenser section 106, along with an adiabatic section 104 extending therebetween. The heat pipe 100 further includes an elongate tube, a working fluid (such as water, liquid potassium, sodium, or alkali metal) and a wick 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses into a liquid pool 110 and gives off its latent heat. The condensed liquid is then returned to the evaporator section 102 through the wick 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

Generally during assembly of the heat pipe 100, a container lid 114 (e.g., an end cap) is utilized to seal the wick 108 and working fluid within a container 112 (e.g., an elongate tube) of the heat pipe 100. The container lid 114 includes an end plug 116 extending therefrom that is configured to couple to the wick 108 at an interface 118. It is necessary to maintain a seal at the interface 118 between the end plug 116 of the heat pipe 100 and the evaporator section 102 of the wick 108.

In nuclear systems, heat pipes are utilized by placing the evaporator section of the heat pipe within a reactor core containing nuclear fuel and the condenser section is placed near heat exchangers. The nuclear fuel heats up and vaporizes the working fluid within the heat pipe at the evaporator section and heat exchangers absorb the latent heat coming from the condenser section. Example heat pipes in nuclear applications are described in U.S. Pat. Nos. 11,650,016, 5,684,848, 6,768,781, and 10,643,756, all of which are incorporated by reference herein in their entirety.

One process and tooling for attaching wick plugs (e.g., the end plug 116) to an annular wick (e.g., the wick 108)

involves mechanically crimping the wick plug into the wick using a shop press and die set. After mechanical crimping, the wick and wick plug(s) are transported to a furnace to bond the wick plug to the wick. Although this process may yield successful results, it requires extensive operator manipulation of the fragile wick, which introduces a number of opportunities for operator error to damage the wick. In some instances this process yielded varying results.

In another process, used for smaller length wicks, two operators must fixture the wick level and perpendicular to a die set in a shop press. Once this is achieved, the operators must align the wick, wick plug, and a crimp ring within the die set. Once aligned, the operator must use the press to apply a prescribed pressure onto the die set, remove the crimped assembly from the dies, and crimp again before transporting the wick to a furnace to bond the wick plug to the wick. As such, in some instances the wick attachment process requires significant handling of the wick. In many cases the wick is cumbersome and sensitive to the stresses of its own weight in a longer form (e.g., approximately 12 feet long or longer).

In view of the above, it is a priority to minimize operator handling of the wick to reduce the likelihood of unintentionally damaging the wick. Not only does visibly damaging the wick render it unfit for operation, but significant handling can introduce damage that cannot be detected until the wick is tested. In addition, crimping the wick plug into the wick and then separately bonding the wick plug to the wick at temperature allows the stresses induced by crimping that create a uniform contact between the wick and wick plug to relax before being exposed to bonding temperatures. This relaxation can open leak paths at the interface between the wick and wick plug that would ultimately compromise the liquid-vapor boundary the wick must provide in the heat pipe. It is the goal of the present disclosure to provide devices and methods for attaching a wick plug to a wick, such as an annular wick.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method of attaching a wick plug to an annular wick is disclosed. In some aspects, the annular wick defines an outside diameter. In some aspects, the method comprises positioning the wick plug at least partially within the annular wick. In some aspects, the method comprises placing a clamp over the outside diameter of the annular wick. In some aspects, the method comprises heating the clamp, the annular wick, and the wick plug to a temperature sufficient to thermally expand the wick plug and the annular wick to exert a compressive force onto the wick plug and the annular wick by the clamp to compress the wick plug and the annular wick together.

In various aspects, a clamp for attaching a wick plug to an annular wick is disclosed. In some aspects, the annular wick defines an outside diameter. In some aspects, the wick plug and the annular wick comprise a first material having a first coefficient of thermal expansion. In some aspects, the clamp comprises a clamp body. In some aspects, the clamp body defines an arcuate exterior surface defining a center axis. In some aspects, the clamp body defines an inner diameter to receive the annular wick and wick plug therein. In some aspects, the inner diameter is equal to or less than 0.010 inch greater than the outside diameter of the annular wick. In some aspects, the inner diameter is centered on the center axis of the arcuate exterior surface. In some aspects, the clamp body comprises a second material having a second coefficient of thermal expansion that is less than the first coefficient of thermal expansion.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 16 is a flow chart depicting a method of attaching a wick and a wick plug together, in accordance with at least one aspect of the present disclosure.

Corresponding reference characters indicate corresponding parts throughout the several views. The exemplifications set out herein illustrate various aspects of the disclosure, in one form, and such exemplifications are not to be construed as limiting the scope of the disclosure in any manner.

DETAILED DESCRIPTION

Figure 1:
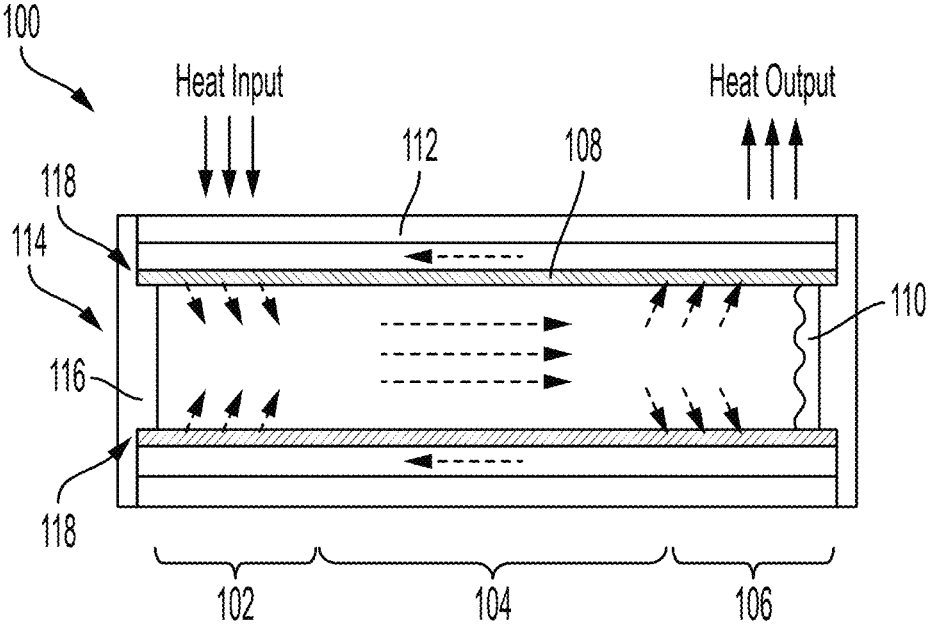
FIG. 1 is a cross-section view of a heat pipe including an annular wick, illustrating a condenser end, an evaporator end, and an adiabatic section of the heat pipe, in accordance with at least one aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the methods and devices for attaching a wick plug to a wick in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

One solution to the above mentioned issues with wick plug attachment is a clamp which eliminates the need for mechanically crimping wick plugs into wicks and then separately and subsequently heating the wick and wick plug to fuse the wick plugs to the wick. In various aspects, the clamp comprises a material that has a lower coefficient of thermal expansion than the wick plug and/or the wick. The clamp is placed around the wick at an end of the wick where the wick plug has already been inserted at room temperature. The entire assembly is then inserted into a furnace and heated. As the furnace increases in temperature, the wick and wick plug expand faster than the wick plug clamps due, at least in part, to the difference in thermal expansion coefficients between the material of the clamp and the material of the wick and wick plug. In at least one aspect, at bonding temperatures, the wick and wick plug thermally expand to an outside diameter greater than the inside diameter of the clamp at the same temperature. As the wick and the wick plug thermally expand into the inside diameter of the clamp, the clamp exerts a compression force back onto the wick and the wick plug. This compression force ensures that a solid, uniform contact, is present between the wick and wick plug for a strong bond to form.

Figure 2:
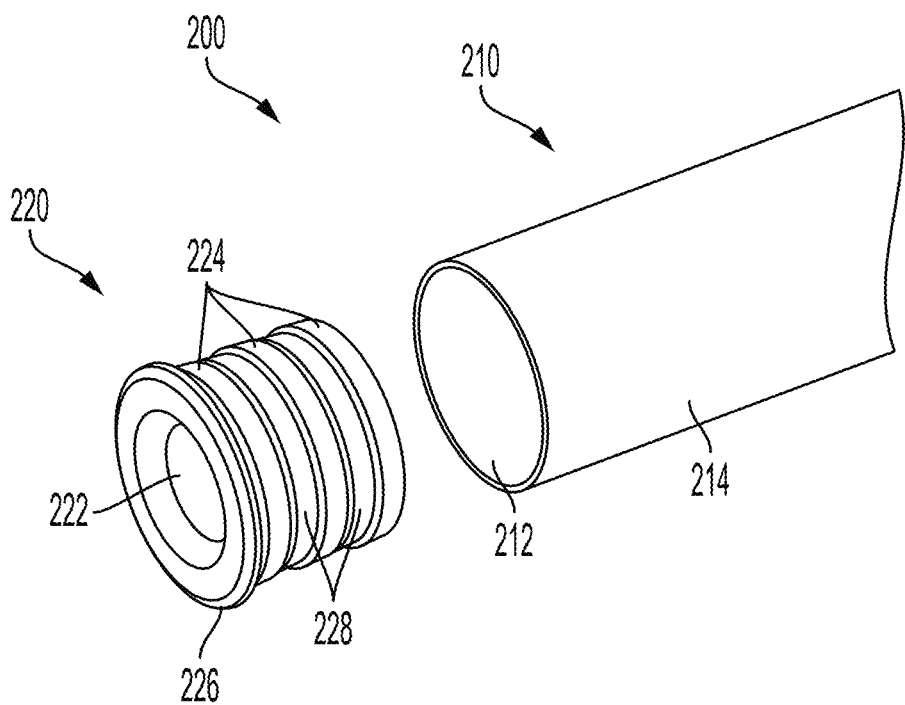
FIG. 2 is a perspective view of an annular wick and a wick plug, in accordance with at least one aspect of the present disclosure.
Figure 3:
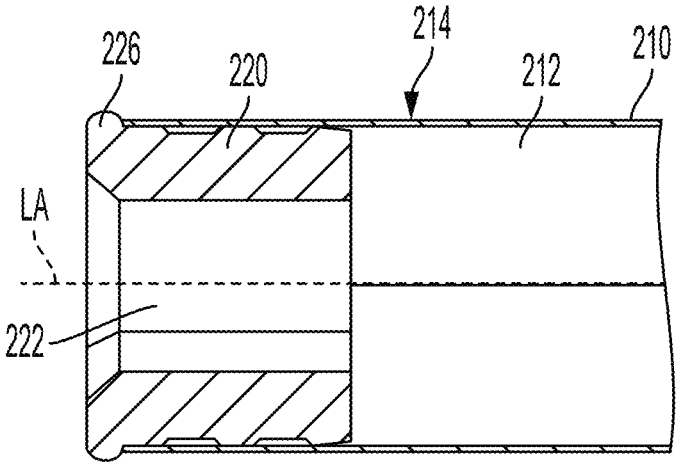
FIG. 3 is a cross-section view of the annular wick and the wick plug of FIG. 2, depicting the wick plug at least partially positioned within the annular wick, in accordance with at least one aspect of the present disclosure.

FIG. 2 illustrates a wick assembly having an annular wick 210 and a wick plug 220. The annular wick 210 defines an inside diameter 212 and an outside diameter 214. The wick plug 220 defines an inside diameter 222, an outside diameter 224, and an annular protrusion 226. The inside diameter 222 extends through the length of the wick plug 220. The annular protrusion 226 is defined at one end of the wick plug 220. In at least one aspect, the wick plug 220 defines annular grooves 228 defined therein. In at least one aspect, the wick plug 220 is inserted into the annular wick 210 such that the outside diameter 224 of the wick plug 220 is received, at least partially, within the inside diameter 212 of the annular wick, as shown in FIG. 3. In at least one aspect, the wick plug 220 may be inserted such that the annular protrusion 226 of the wick plug 220 abuts the annular wick 210 preventing the wick plug 220 from being inserted any further into the annular wick 210.

Figure 5:
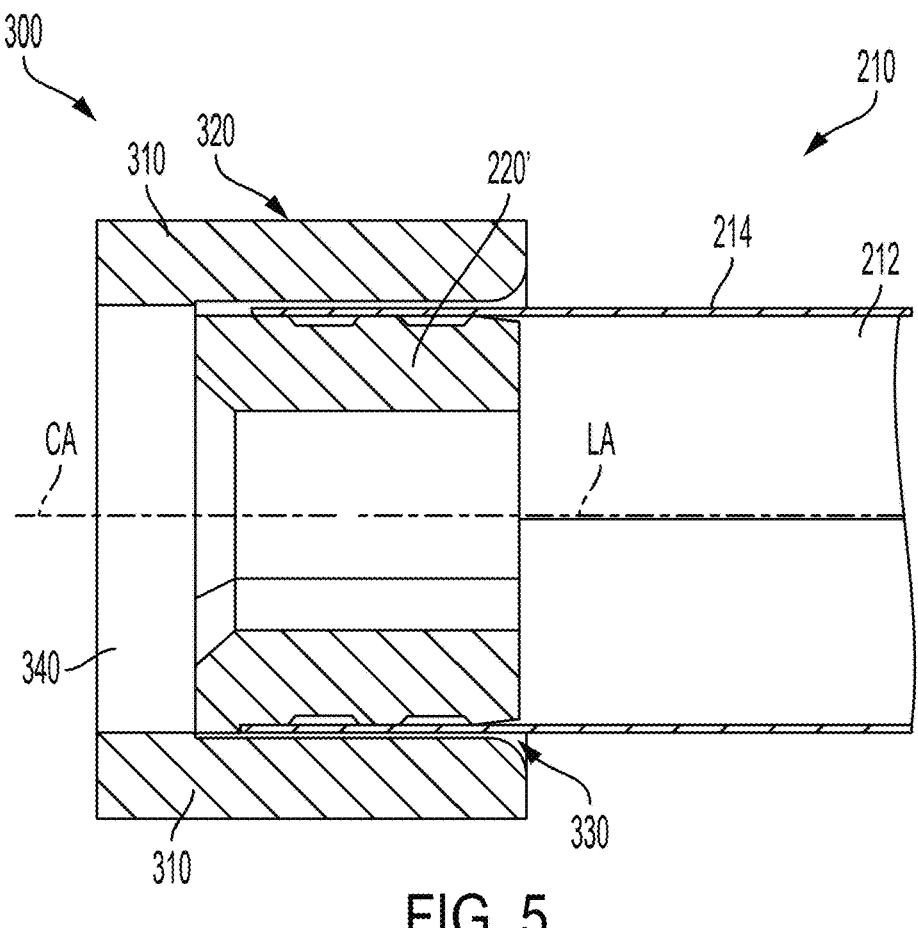
FIG. 5 is a cross section view of the clamp of FIG. 4, depicting the clamp positioned around an outside diameter of an annular wick with a wick plug positioned at least partially within the annular wick, in accordance with at least one aspect of the present disclosure.

Further to the above, in certain instances, the wick plug 220 may not have an annular protrusion 226 at one end. For example, FIG. 5 illustrates the annular wick 210 with a wick plug 220' inserted, at least partially, into the inside diameter 212 of the annular wick 210. The wick plug 220' is identical to the wick plug 220 except that the wick plug 220' does not have an annular protrusion on one end, such as the annular protrusion 226. As such, in at least one aspect, the entire wick plug 220' may be inserted into the annular wick 210 such that the wick plug 220' and annular wick 210 are flush at one end. In any event, when the wick plug 220, 220' is positioned at least partially within the annular wick 210, the wick plug 220, 220' and the annular wick 210 define a longitudinal axis LA. In at least one aspect, the wick plug 220, 220' may be press fit into the annular wick 210.

Further to the above, in at least one aspect, the annular wick 210 and the wick plug 220, 220' comprise a first material having a first coefficient of thermal expansion. In at least one aspect, the wick plug 220, 220' and the annular wick 210 comprise stainless steel. In at least one aspect, the wick plug 220, 220' and the annular wick 210 may be comprised of different materials.

Figure 4:
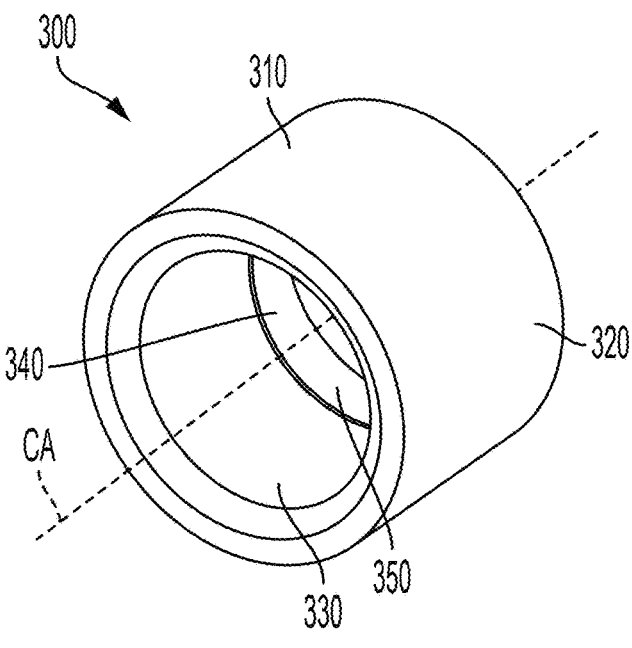
FIG. 4 is a perspective view of a clamp for attaching a wick plug to an annular wick, in accordance with at least one aspect of the present disclosure.

FIG. 4 illustrates a clamp 300 for attaching a wick plug (e.g., the wick plug 220') to an annular wick (e.g., the annular wick 210). The clamp 300 comprises a clamp body 310 defining an arcuate exterior surface 320 and an inner diameter 330. The arcuate exterior surface 320 and the inner diameter 330 are concentric and define a center axis CA. As such, the inner diameter 330 is centered on the center axis CA of the arcuate exterior surface 320. In at least one aspect, the clamp body 310 defines a lip 340 adjacent to the inner diameter 330. The lip 340 defines an inner diameter 350 that is smaller than the inner diameter 330.

Further to the above, in at least one aspect, the arcuate exterior surface 320 defines a circular profile. In at least one aspect, the arcuate exterior surface 320 defines an elliptical profile. In at least one aspect, the clamp body 310 defines a one piece annular ring. In various aspects, the clamp body 310 may be constructed of one or more pieces, as discussed in greater detail herein. In any event, the inner diameter 330 is to receive the annular wick 210 and the wick plug 220' therein, as discussed in greater detail below.

In use, the wick plug 220' is positioned at least partially within the annular wick 210 and the clamp 300 is placed over the outside diameter 214 of the annular wick 210. In at least one aspect, the clamp 300 is slid onto the wick plug 220' and the annular wick 210 until the lip 340 of the clamp 300 abuts the ends of the wick plug 220' and the annular wick 210 as shown in FIG. 5. More specifically, the inner diameter 330 of the clamp receives the outside diameter 214 of the annular wick 210. In at least one aspect, the lip 340 prevents the user from sliding the clamp 300 along the annular wick 210 into a position where the clamp body 310 does not overlap with the wick plug 220' within the annular wick 210. In at least one aspect, when the clamp 300 is placed over the outer diameter of the annular wick 210, the central axis CA of the clamp 300 is colinear with the longitudinal axis of the wick plug 220' and the annular wick 210 as shown in FIG. 5.

Further to the above, in at least one aspect, the inner diameter 330 of the clamp 300 is equal to or less than 0.010 inch greater than the outside diameter 214 of the annular wick 210. In at least one aspect, the inner diameter 330 of the clamp 300 is 0.001 inch greater than the outside diameter 214 of the annular wick 210. In at least one aspect, the inner diameter 330 of the clamp 300 is 0.010 inch greater than the outside diameter 214 of the annular wick 210. In at least one aspect, the inner diameter 330 of the clamp 300 is between 0.001 inch and 0.010 inch greater than the outside diameter 214 of the annular wick 210.

Figure 6:
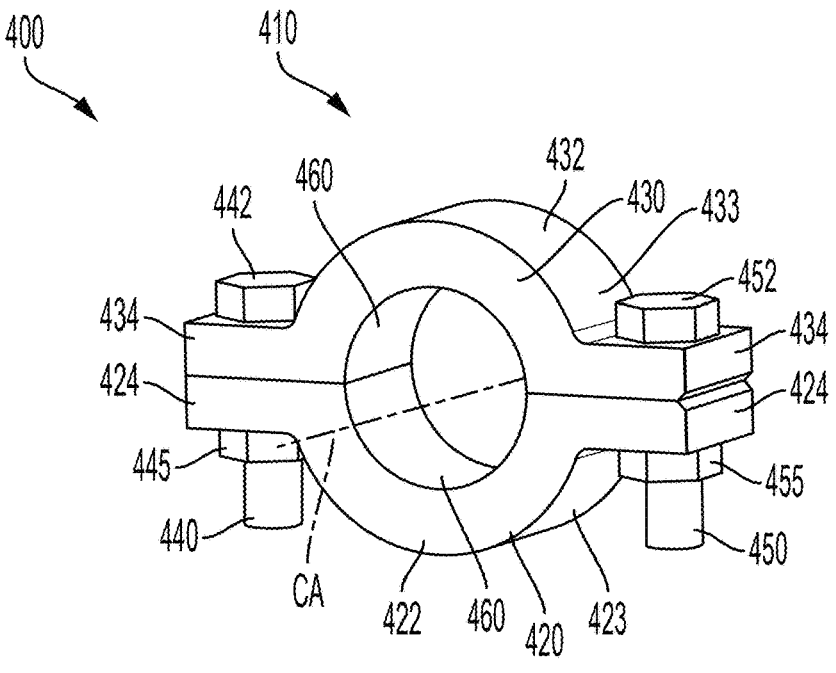
FIG. 6 is a perspective view of another clamp for attaching a wick plug to an annular wick, in accordance with at least one aspect of the present disclosure.
Figure 7:
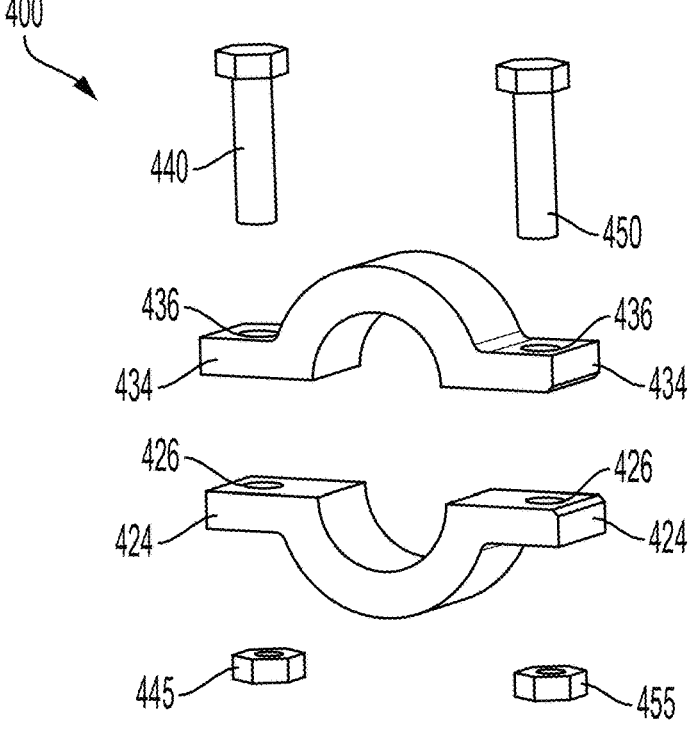
FIG. 7 is an exploded view of the clamp of FIG. 6, in accordance with at least one aspect of the present disclosure.

FIGS. 6 and 7 illustrate a clamp 400 comprising a two-piece clamp body 410, a first bolt 440, a second bolt 450, a first nut 445, and a second nut 455. The two-piece clamp body 410 comprises a first clamp portion 420 and a second clamp portion 430 attachable to each other to from the two-piece clamp body 410. In at least one aspect, the first clamp portion 420 and the second clamp portion 430 define an inner diameter 460 when the first clamp portion 420 and the second clamp portion 430 are attached to each other. The inner diameter 460 defines a central axis CA, as shown in FIG. 6.

Further to the above, the first clamp portion 420 comprises a first arcuate body 422 and the second clamp portion comprises a second arcuate body 432. The first arcuate body 422 defines a first arcuate exterior surface 423 and the second arcuate body 432 defines a second arcuate exterior surface 433. When the first clamp portion 420 is attached to the second clamp portion 430, the first arcuate exterior surface 423 and the second arcuate exterior surface 433 are concentric with the inner diameter 460 and centered about the center axis CA.

Further to the above, the first clamp portion 420 comprises a pair of first lugs 424 extending from either side of the first arcuate body 422. Similarly, the second clamp portion 430 comprises a pair of second lugs 434 extending from either side of the second arcuate body 432. Each of the first lugs 424 define a first through hole 426 and each of the second lugs 434 define a second through hole 436. In various aspects, the first lugs 424 are coupled to their respective second lugs 434 to attach the first clamp portion 420 and the second clamp portion 430 to each other, as discussed in greater detail below.

In use, to attach the first clamp portion 420 and the second clamp portion 430 together, the first lugs 424 are aligned and engaged with their respective second lugs 434, the first through holes 426 are aligned with their respective second through holes 436, and the first bolt 440 and the second bolt 450 are positioned through the through holes 426, 436 as shown in FIG. 6. In at least one aspect, the bolts 440, 450 comprise a sufficient length to extend through the through holes 426, 436. In any event, the first nut 445 can then be threaded onto the first bolt 440 to capture the lugs 424, 434 between the first nut 445 and a first head 442 of the first bolt 440. Similarly, the second nut 455 can be threaded onto the second bolt 450 to capture the lugs 424, 434 between the second nut 455 and a second head 452 of the second bolt 450.

Figure 8:
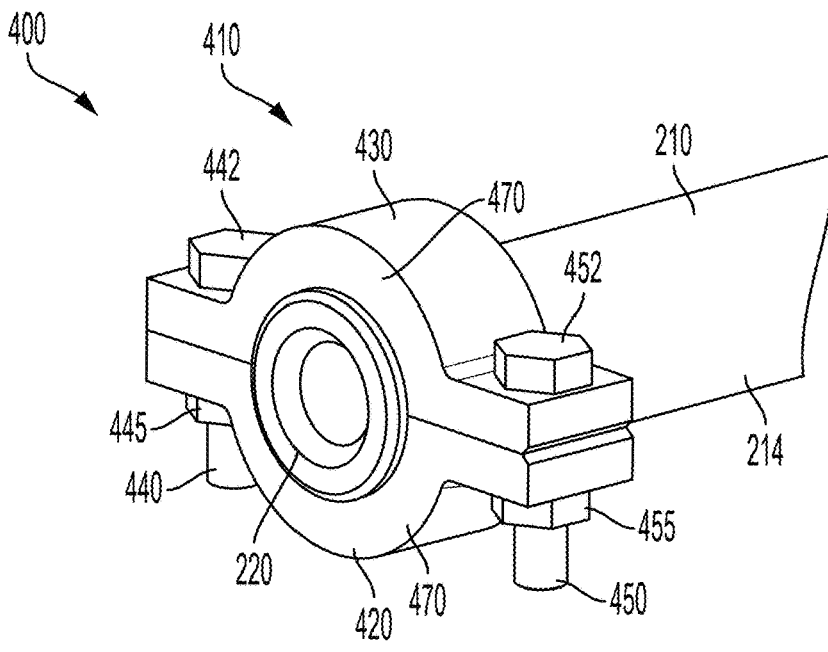
FIG. 8 is a perspective view of the clamp of FIG. 6, depicting the clamp positioned onto an outside diameter of the annular wick with the wick plug positioned at least partially within the annular wick, in accordance with at least one aspect of the present disclosure.
Figure 9:
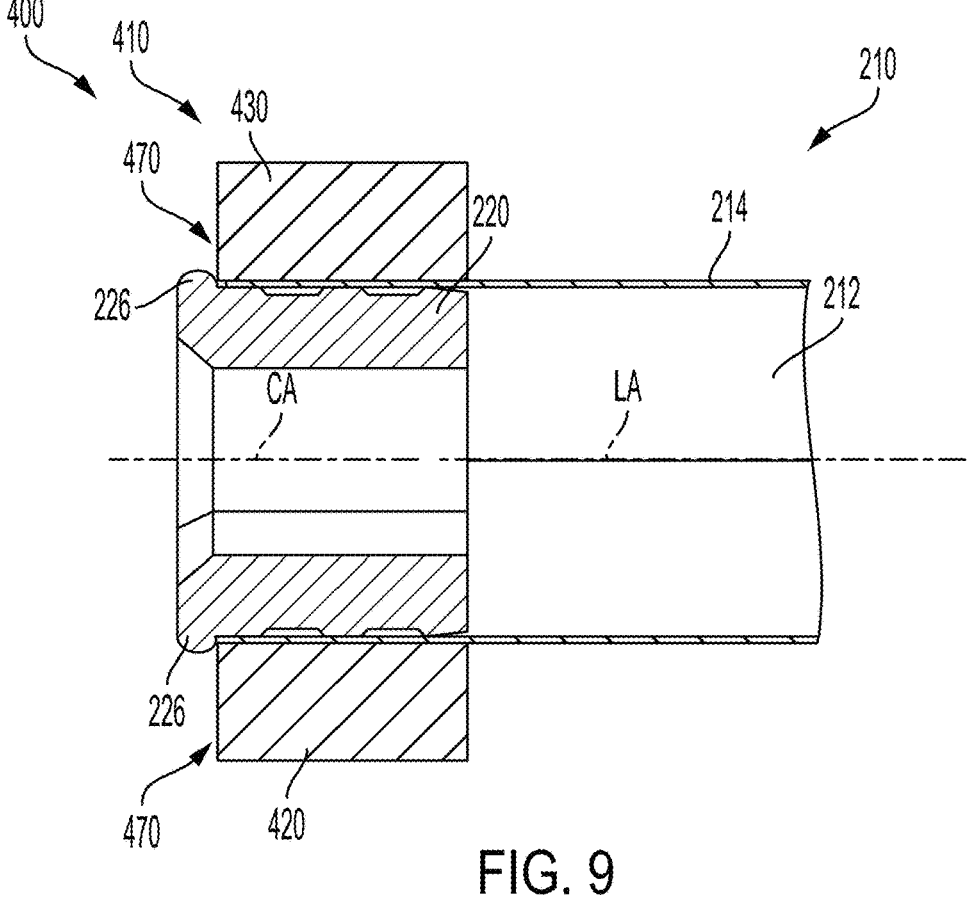
FIG. 9 is a cross section view of the clamp, the annular wick, and the wick plug of FIG. 8, in accordance with at least one aspect of the present disclosure.

FIGS. 8 and 9 illustrate the clamp 400 positioned onto the outside diameter 214 of the annular wick 210 with the wick plug 220 positioned, at least partially, within the annular wick 210. In at least one aspect, the nuts 445, 455 may be loosened to space the first clamp portion 420 and the second clamp portion 430 apart so that the clamp 400 can fit over the annular protrusion 226 of the wick plug 220. In at least one aspect, the clamp 400 is positioned around and clamped onto the outside diameter 214 of the annular wick 210 such that a face 470 of the clamp 400 abuts the annular protrusion 226. In any event, the nuts 445, 455 can be tightened as the bolt heads 442, 452 are held stationary (or vice versa) in order to clamp the clamp 400 onto the outside diameter 214 of the annular wick 210. In at least one aspect, the central axis CA defined by the inner diameter 460 of the clamp 400 is colinear with the longitudinal axis LA of the annular wick 210 and the wick plug 220 when the clamp 400 is clamped onto the annular wick 210, as shown in FIG. 9.

Further to the above, in at least one aspect, the inner diameter 460 of the clamp 400 is equal to or less than 0.010 inch greater than the outside diameter 214 of the annular wick 210. In at least one aspect, the inner diameter 460 of the clamp 400 is 0.001 inch greater than the outside diameter 214 of the annular wick 210. In at least one aspect, the inner diameter 460 of the clamp 400 is 0.010 inch greater than the outside diameter 214 of the annular wick 210. In at least one aspect, the inner diameter 460 of the clamp 400 is between 0.001 inch and 0.010 inch greater than the outside diameter 214 of the annular wick 210.

Figure 10:
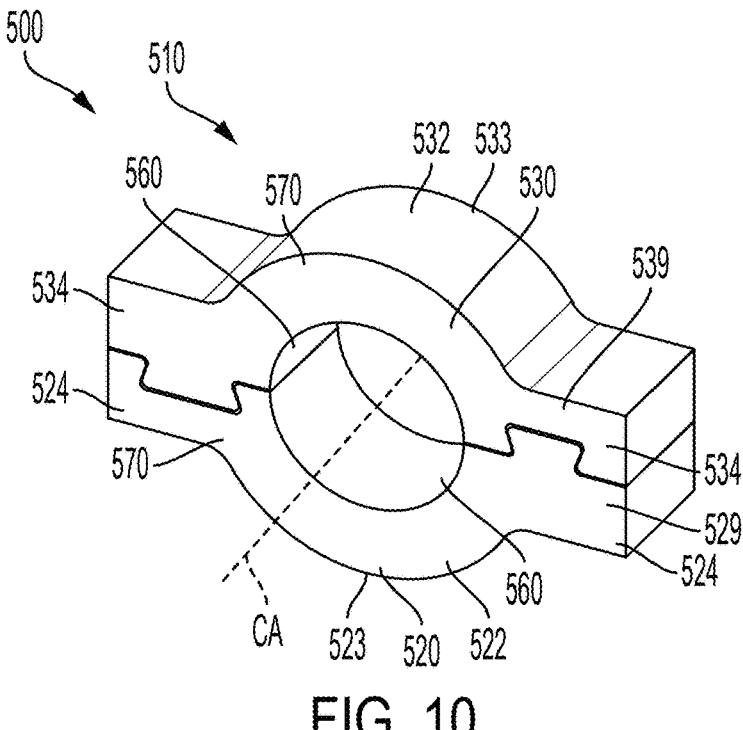
FIG. 10 is a perspective view of a dovetail clamp for attaching a wick plug to an annular wick, in accordance with at least one aspect of the present disclosure.
Figure 11:
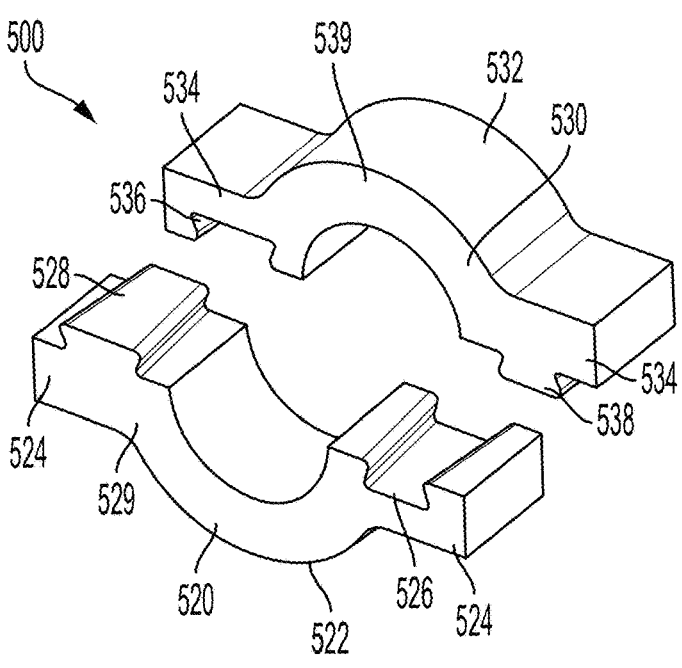
FIG. 11 is an exploded view of the dovetail clamp of FIG. 10, in accordance with at least one aspect of the present disclosure.

FIGS. 10 and 11 illustrate a clamp 500 comprising a two-piece clamp body 510 comprising a first clamp portion 520 and a second clamp portion 530 attachable to each other to from the two-piece clamp body 510. In at least one aspect, first clamp portion 520 and the second clamp portion 530 define an inner diameter 560 when the first clamp portion 520 and the second clamp portion 530 are attached to each other. The inner diameter 560 defines a central axis CA, as shown in FIG. 10.

Further to the above, the first clamp portion 520 comprises a first arcuate body 522 and the second clamp portion comprises a second arcuate body 532. The first arcuate body 522 defines a first arcuate exterior surface 523 and the second arcuate body 532 defines a second arcuate exterior surface 533. When the first clamp portion 520 is attached to the second clamp portion 530, the first arcuate exterior surface 523 and the second arcuate exterior surface 533 are concentric with the inner diameter 560 and centered about the center axis CA.

Further to the above, the first clamp portion 520 comprises a pair of first lugs 524 extending from either side of the first arcuate body 522. Similarly, the second clamp portion 530 comprises a pair of second lugs 534 extending from either side of the second arcuate body 532. One of the first lugs 524 defines a first dovetail slot 526 and the other of the first lugs 524 defines a first dovetail protrusion 528. Similarly, one of the second lugs 534 defines a second dovetail slot 536 and the other of the second lugs 534 defines a second dovetail protrusion 538. In various aspects, the first lugs 524 are coupled to their respective second lugs 534 to attach the first clamp portion 520 and the second clamp portion 530 to each other, as discussed in greater detail below.

In use, to attach the first clamp portion 520 and the second clamp portion 530 together, the first dovetail protrusion 528 is received in the second dovetail slot 536 and the second dovetail protrusion 538 is received in the first dovetail slot 526. As can be seen in FIG. 11, the first dovetail protrusion 528 is tapered in the opposite direction of the first dovetail slot 526 on the first clamp portion 520. In other words, the wider end of the first dovetail protrusion 528 and the smaller end of the first dovetail slot 526 are positioned near the same face of the first clamp portion 520. Similarly, the second dovetail protrusion 538 is tapered in the opposite direction of the second dovetail slot 536 on the second clamp portion 530. As such, when the first dovetail protrusion 528 is fully received in the second dovetail slot 536 and the second dovetail protrusion 538 is fully received in the first dovetail slot 526, the first clamp portion 520 and the second clamp portion 530 are interlocked together due to the dovetail configuration provided on the lugs 524, 534. In at least one aspect, the first clamp portion 520 and the second clamp portion 530 are considered interlocked together when a first face 529 of the first clamp portion 520 and a second face 539 of the second clamp portion 530 are aligned with each other, as shown in FIG. 10.

Figure 12:
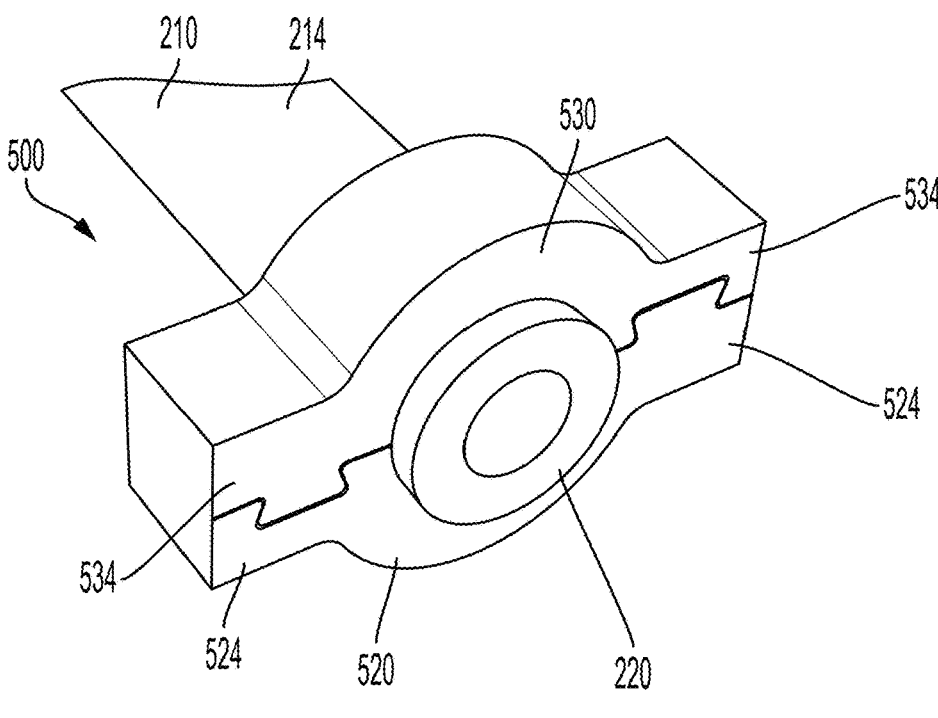
FIG. 12 is a perspective view of the dovetail clamp of FIG. 10, depicting the dovetail clamp positioned around one end of an annular wick with a wick plug at least partially positioned within the annular wick, in accordance with at least one aspect of the present disclosure.
Figure 13:
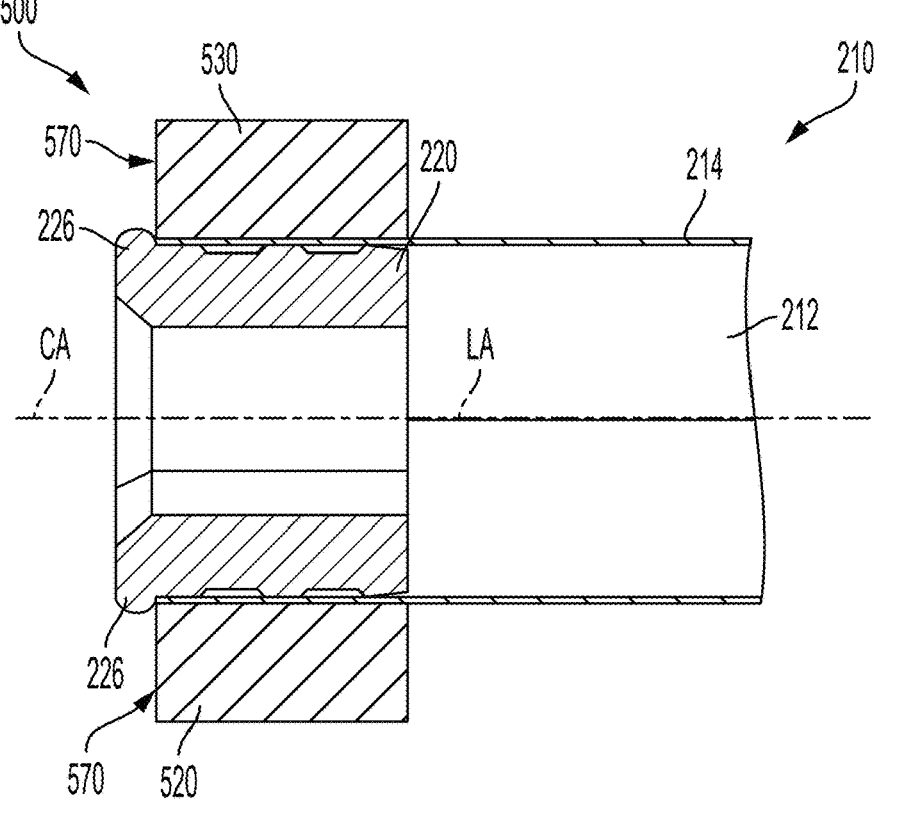
FIG. 13 is a cross section view of the dovetail clap, the annular wick, and the wick plug of FIG. 12, in accordance with at least one aspect of the present disclosure.

FIGS. 12 and 13 illustrate the clamp 500 positioned onto the outside diameter 214 of the annular wick 210 with the wick plug 220 positioned, at least partially, within the annular wick 210. In at least one aspect, the first clamp portion 520 and the second clamp portion 530 can be positioned around the outside diameter 214 of the annular wick 210 separately and then slid relative to each other along the longitudinal axis LA of the annular wick 210 and the wick plug 220 to interlock the first clamp portion 520 and the second clamp portion 530 by way of the dovetail slots 526, 536 and the dovetail protrusions 528, 538. In at least one aspect, the clamp 500 is positioned around and clamped onto the outside diameter 214 of the annular wick 210 such that a face 570 of the clamp 500 abuts the annular protrusion 226 of the wick plug 220. In any event, as the first clamp portion 520 and the second clamp portion 530 are slid relative to each other, the clamp 500 will clamp onto the outside diameter 214 of the annular wick 210 owing to the dovetail protrusion and slot arrangement on the lugs 524, 534. In at least one aspect, the central axis CA defined by the inner diameter 560 of the clamp 500 is colinear with the longitudinal axis LA of the annular wick 210 and the wick plug 220 when the clamp 500 is clamped onto the annular wick 210, as shown in FIG. 13.

Further to the above, in at least one aspect, the inner diameter 560 of the clamp 500 is equal to or less than 0.010 inch greater than the outside diameter 214 of the annular wick 210. In at least one aspect, the inner diameter 560 of the clamp 500 is 0.001 inch greater than the outside diameter 214 of the annular wick 210. In at least one aspect, the inner diameter 560 of the clamp 500 is 0.010 inch greater than the outside diameter 214 of the annular wick 210. In at least one aspect, the inner diameter 560 of the clamp 500 is between 0.001 inch and 0.010 inch greater than the outside diameter 214 of the annular wick 210.

Figure 14:
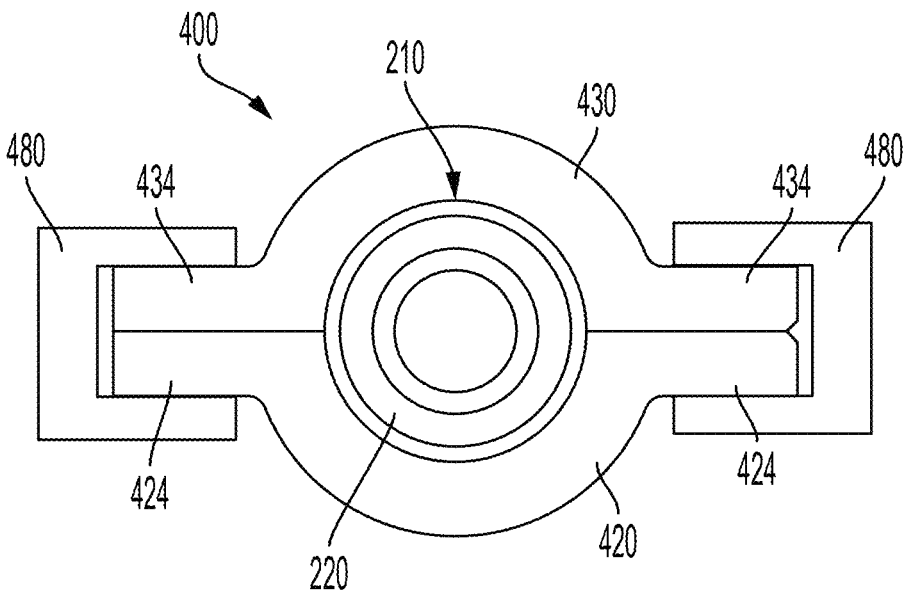
FIG. 14 is a front view of the clamp of FIG. 6 without nuts and bolts, depicting a mechanical clamp positioned on lugs of the clamp, in accordance with at least one aspect of the present disclosure.

Turning now to FIG. 14, in certain instances, the clamp 400 may not require nuts and/or bolts to attach the first clamp portion 420 and the second clamp portion 430 together. In such instances, a mechanical clamp, such as the mechanical clamp 480 shown in FIG. 14, can be slid onto the lugs 424, 434, on one or more sides of the clamp 400, to hold the first clamp portion 420 and the second clamp portion 430 together. In at least one aspect, the mechanical clamp 480 may be spring loaded. In at least one aspect, the mechanical clamp 480 may be made of a flexible material that can be flexed outward and then clamped onto the lugs 424, 434, for example.

Figure 15:
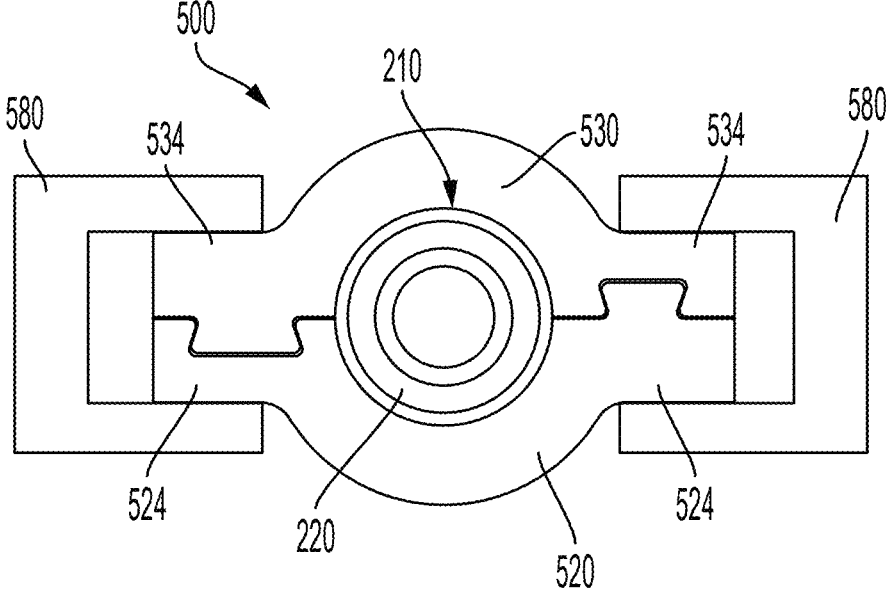
FIG. 15 is a front view of the clamp of FIG. 10, depicting a mechanical clamp position on the lugs of the clamp, in accordance with at least one aspect of the present disclosure.

Turning now to FIG. 15, in certain instances, the dovetail slots and protrusions of the clamp 500 may be utilized along with a mechanical clamp, such as the mechanical clamp 580. In various aspects, the mechanical clamp 580 may be slid onto the lugs 524, 534, on one or more sides of the clamp 500, to further aid in holding the first clamp portion 520 and the second clamp portion 530 together. In at least one aspect, the mechanical clamp 580 may be spring loaded. In at least one aspect, the mechanical clamp 580 may be made of a flexible material that can be flexed outward and then clamped onto the lugs 524, 534, for example.

In various aspects, any of the clamp bodies 310, 410, 510 of the clamps 300, 400, 500 may comprise a second material. In at least one aspect, the second material has a smaller coefficient of thermal expansion than the first material of the wick plug 220, 220' and the annular wick 210. In certain instances, the annular wick 210 and the wick plug 220, 220' may be comprised of different materials. In at least one aspect, the annular wick 210 and the wick plug 220, 220' are comprised of different materials with each of the different materials have a greater coefficient of thermal expansion than the clamp bodies 310, 410, 510 of the clamps 300, 400, 500. In at least one aspect, the second material of the clamp bodies 310, 410, 510 is a refractory alloy such as molybdenum, or any molybdenum hybrid variation such as Titanium-Zirconium-Molybdenum (TZM), or tungsten, for example. In at least one aspect, the second material of the clamp bodies 310, 410, 510 is a refractory metal, a ceramic, a low expansion alloy, or a combination thereof.

FIG. 16 illustrates a method 1000 of attaching a wick plug, such as the wick plug 220 or 220', to a wick, such as the annular wick 210, in accordance with at least one aspect of the present disclosure. As discussed above, a wick plug, such as the wick plug 220 or 220', may be positioned within an end of a wick, such as the annular wick 210. In at least one aspect, the wick plug is at least partially positioned within the wick at room temperature. In the method 1000, attaching a wick plug to an annular wick comprises positioning the wick plug at least partially within the annular wick at step 1002, placing a clamp, such as any of the clamps 300, 400, 500, over the outside diameter 214 of the annular wick 210 at step 1004, and then heating the clamp, the annular wick, and the wick plug to a temperature sufficient to thermally expand the wick plug and the annular wick to exert a compressive force onto the wick plug and the annular wick by the clamp to compress the wick plug and the annular wick together at step 1006.

In at least one aspect of the method 1000, the compression force exerted on the wick plug and the wick by the clamp, such as any one of the clamps 300, 400, 500, is due to the thermal expansion coefficients of the material(s) of the wick and the wick plug being greater than the thermal expansion coefficient of the material(s) of the clamp. In at least one aspect of the method 1000, the annular wick 210 comprises a first compressive yield strength and the wick plug 220, 220' comprises a second compressive yield strength. In such instances, the compressive force exerted onto the wick plug 220, 220' and the annular wick 210 by the clamp during heating is equal to or greater than the lesser of the first compressive yield strength of the annular wick 210 or the second compressive yield strength of the wick plug 220, 220'.

In various aspects, the sufficient temperature of the method 1000 for attaching the wick plug to the wick is based on the materials selected for the wick plug, the annular wick, and the clamp. In various aspects, the sufficient temperature of the method 1000 for attaching the wick plug to the wick is a temperature in which the wick and the wick plug will thermally expand to an outside diameter greater than the inside diameter of the clamp, such as the inside diameters 330, 460, 560 of the clamps 300, 400, 500, respectively. In such instances, as the wick and the wick plug expand into the inside diameter of the clamp, the inside diameter of the clamp exerts the aforementioned compression force onto the wick and the wick plug. In various aspects, the compression force exerted by the clamp onto the wick and the wick plug ensures that uniform contact is present between the wick and the wick plug to permit a strong, uniform bond to form between the wick and the wick plug when the assembly is heated to the sufficient temperature.

Further to the above, in at least one aspect, the method 1000 further comprises placing the entire assembly of the clamp, the wick, and the wick plug into a furnace to heat the assembly to the sufficient temperature to attach the wick plug to the wick. In at least one aspect, the furnace is a vacuum furnace. In at least one aspect, the furnace is configured to provide a protective atmosphere for the assembly during heating and cooling operations.

Further to the above, in various aspects, the annular wick 210 may have a wick plug, such as the wick plug 220 or the wick plug 220' positioned at both of its ends. In at least one aspect, the annular wick 210 may have the wick plug 220 positioned at one end and the wick plug 220' positioned at the other end. In any event, the method 1000 may be performed at both ends of the wick to attach a wick plug at both ends of the annular wick 210.

Various aspects of the present disclosure include, but are not limited to, the aspects listed in the following numbered clauses.

Clause 1—A method of attaching a wick plug to an annular wick. The annular wick defines an outside diameter. The method comprises: positioning the wick plug at least partially within the annular wick; placing a clamp over the outside diameter of the annular wick; and heating the clamp, the annular wick, and the wick plug to a temperature sufficient to thermally expand the wick plug and the annular wick to exert a compressive force onto the wick plug and the annular wick by the clamp to compress the wick plug and the annular wick together.

Clause 2—The method of clause 1, wherein the wick plug and the annular wick comprise a first material having a first coefficient of thermal expansion, and wherein the clamp comprises a second material having a second coefficient of thermal expansion that is less than the first coefficient of thermal expansion.

Clause 3—The method of any one of clauses 1 or 2, wherein the annular wick comprises a first compressive yield strength and the wick plug comprises a second compressive yield strength, and wherein the compressive force exerted onto the wick plug and the annular wick is equal to or greater than the lesser of the first compressive yield strength or the second compressive yield strength.

Clause 4—The method of any one of clauses 1-3, wherein the clamp comprises a first clamp portion and a second clamp portion, and wherein placing the clamp over the outside diameter of the annular wick comprises positioning the first clamp portion and the second clamp portion around the outside diameter of the annular wick and attaching the first clamp portion and the second clamp portion to each other.

Clause 5—The method of clause 4, wherein attaching the first clamp portion and the second clamp to each other comprises mechanically fastening the first clamp portion and the second clamp to each other.

Clause 6—The method of clause 4, wherein attaching the first clamp portion and the second clamp portion to each other comprises sliding the first clamp portion and the second clamp portion relative to each other along a longitudinal axis of the annular wick.

Clause 7—The method of clause 6, wherein the first clamp portion comprises a dovetail protrusion and the second clamp portion comprises a dovetail slot that corresponds to the dovetail protrusion, and wherein sliding the first clamp portion and the second clamp portion relative to each other comprises receiving the dovetail protrusion in the dovetail slot.

Clause 8—The method of any one of clauses 1-7, further comprising placing the clamp, the annular wick, and the wick plug into a furnace to heat the clamp, the annular wick, and the wick plug to the temperature.

Clause 9—The method of clause 8, wherein the furnace is a vacuum furnace.

Clause 10-A clamp for attaching a wick plug to an annular wick. The annular wick defines an outside diameter. The wick plug and the annular wick comprise a first material having a first coefficient of thermal expansion. The clamp comprises a clamp body. The clamp body defines: an arcuate exterior surface defining a center axis; and an inner diameter to receive the annular wick and wick plug therein, wherein the inner diameter is equal to or less than 0.010 inch greater than the outside diameter of the annular wick, wherein the inner diameter is centered on the center axis of the arcuate exterior surface, and wherein the clamp body comprises a second material having a second coefficient of thermal expansion that is less than the first coefficient of thermal expansion.

Clause 11—The clamp of clause 10, wherein the clamp body is a one piece annular ring.

Clause 12—The clamp of clause 10, wherein the clamp body comprises a first clamp portion and a second clamp portion attachable to each other to form the clamp body and define the inner diameter.

Clause 13—The clamp of clause 12, wherein the first clamp portion comprises a first arcuate body and the second clamp portion comprises a second arcuate body.

Clause 14—The clamp of clause 13, wherein the first clamp portion comprises a first lug extending from the first arcuate body, wherein the second clamp portion comprises a second lug extending from the second arcuate body, and wherein the first lug and the second lug are aligned with each other when the first clamp portion and the second clamp portion are attached to each other.

Clause 15—The clamp of clause 14, wherein the first lug and the second lug are coupled together to attach the first clamp portion and the second clamp portion to each other.

Clause 16—The clamp of clause 14, wherein the first lug defines a first through hole and the second lug defines a second through hole aligned with the first through hole, wherein the first lug and the second lug are coupled together with a nut and a bolt, the bolt having a length sufficient to extend through the first through hole and the second through hole.

Clause 17—The clamp of clause 14, wherein the first lug comprises a dovetail protrusion and the second lug comprises a dovetail slot configured to receive the dovetail protrusion.

Clause 18. The clamp of clause 14, wherein the first lug and the second lug are coupled together by a mechanical clamp.

Clause 19—The clamp of any one of clauses 10-18, wherein the second material comprises one of molybdenum, any molybdenum hybrid variation such as Titanium-Zirconium-Molybdenum (TZM), tungsten, a refractory alloy, or a combination thereof.

Clause 20—The clamp of any one of clauses 10-18, wherein the second material comprises at least one of a refractory metal, a ceramic, a low expansion alloy, or a combination thereof.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the disclosed disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed disclosure. Accordingly, it will be recognized by persons having ordinary skill in the art that various substitutions, modifications or combinations of any of the exemplary aspects may be made without departing from the scope of the disclosure. In addition, persons skilled in the art will recognize, or be able to ascertain using no more than routine experimentation, many equivalents to the various aspects of the disclosure described herein upon review of this specification. Thus, the disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A method of attaching a wick plug to an annular wick, the annular wick defining an outside diameter, the method comprising:
    positioning the wick plug at least partially within the annular wick;
    placing a clamp over the outside diameter of the annular wick; and
    heating the clamp, the annular wick, and the wick plug to a temperature sufficient to thermally expand the wick plug and the annular wick to exert a compressive force onto the wick plug and the annular wick by the clamp to compress the wick plug and the annular wick together, wherein the clamp comprises a first clamp portion and a second clamp portion, and wherein placing the clamp over the outside diameter of the annular wick comprises positioning the first clamp portion and the second clamp portion around the outside diameter of the annular wick and attaching the first clamp portion and the second clamp portion to each other.

2. The method of claim 1, wherein attaching the first clamp portion and the second clamp portion to each other comprises sliding the first clamp portion and the second clamp portion relative to each other along a longitudinal axis of the annular wick.

3. The method of claim 2, wherein the first clamp portion comprises a dovetail protrusion and the second clamp portion comprises a dovetail slot that corresponds to the dovetail protrusion, and wherein sliding the first clamp portion and the second clamp portion relative to each other comprises receiving the dovetail protrusion in the dovetail slot.

4. The method of claim 1, further comprising placing the clamp, the annular wick, and the wick plug into a furnace to heat the clamp, the annular wick, and the wick plug to the temperature.

5. The method of claim 4, wherein the furnace is a vacuum furnace.

6. The method of claim 1, wherein the wick plug and the annular wick comprise a first material having a first coefficient of thermal expansion, and wherein the clamp comprises a second material having a second coefficient of thermal expansion that is less than the first coefficient of thermal expansion.

7. The method of claim 1, wherein the annular wick comprises a first compressive yield strength and the wick plug comprises a second compressive yield strength, and wherein the compressive force exerted onto the wick plug and the annular wick is equal to or greater than the lesser of the first compressive yield strength or the second compressive yield strength.

8. The method of claim 1, wherein attaching the first clamp portion and the second clamp portion to each other comprises mechanically fastening the first clamp portion and the second clamp portion to each other.

9. A method of attaching a wick plug to an annular wick, the annular wick defining an outside diameter, the method comprising:
    positioning the wick plug at least partially within the annular wick;
    placing a clamp over the outside diameter of the annular wick; and
    heating the clamp, the annular wick, and the wick plug to thermally expand the wick plug and the annular wick at a greater rate than the clamp such that the clamp exerts a compressive force onto the wick plug and the annular wick to compress the wick plug and the annular wick together, wherein the clamp comprises a first clamp portion and a second clamp portion, and wherein placing the clamp over the outside diameter of the annular wick comprises positioning the first clamp portion and the second clamp portion around the outside diameter of the annular wick and attaching the first clamp portion and the second clamp portion to each other.

10. The method of claim 9, wherein attaching the first clamp portion and the second clamp portion to each other comprises sliding the first clamp portion and the second clamp portion relative to each other along a longitudinal axis of the annular wick.

11. The method of claim 10, wherein the first clamp portion comprises a dovetail protrusion and the second clamp portion comprises a dovetail slot that corresponds to the dovetail protrusion, and wherein sliding the first clamp portion and the second clamp portion relative to each other comprises receiving the dovetail protrusion in the dovetail slot.

12. The method of claim 9, further comprising placing the clamp, the annular wick, and the wick plug into a furnace to heat the clamp, the annular wick, and the wick plug to a temperature sufficient to thermally expand the wick plug and the annular wick at a greater rate than the clamp.

13. The method of claim 12, wherein the furnace is a vacuum furnace.

14. The method of claim 9, wherein the wick plug and the annular wick comprise a first material having a first coefficient of thermal expansion, and wherein the clamp comprises a second material having a second coefficient of thermal expansion that is less than the first coefficient of thermal expansion.

15. The method of claim 9, wherein the annular wick comprises a first compressive yield strength and the wick plug comprises a second compressive yield strength, and wherein the compressive force exerted onto the wick plug and the annular wick is equal to or greater than the lesser of the first compressive yield strength or the second compressive yield strength.

16. The method of claim 9, wherein attaching the first clamp portion and the second clamp portion to each other comprises mechanically fastening the first clamp portion and the second clamp portion to each other.

* * * * *